(12) United States Patent
May (10) Patent No.: US 11,266,155 B2
(45) Date of Patent: Mar. 8, 2022

(54) INTERIORLY SUPPORTED EDIBLE STRUCTURE AND RELATED METHODS

(71) Applicant: Jason May, Phoenix, AZ (US)

(72) Inventor: Jason May, Phoenix, AZ (US)

( * ) Notice: Subject to any disclaimer, the term of this patent is extended or adjusted under 35 U.S.C. 154(b) by 770 days.

(21) Appl. No.: 15/342,558

(22) Filed: Nov. 3, 2016

(65) Prior Publication Data

US 2017/0142981 A1    May 25, 2017

Related U.S. Application Data (63) Continuation-in-part of application No. 14/948,358, filed on Nov. 22, 2015, now abandoned.

(51) Int. Cl.
| | | |
|---|---|---|
| *A21D 13/48* | (2017.01) | |
| *A21D 13/47* | (2017.01) | |
| *A23G 3/56* | (2006.01) | |
| *A63F 9/00* | (2006.01) | |

(52) U.S. Cl.
CPC ............. *A21D 13/48* (2017.01); *A21D 13/47* (2017.01); *A23G 3/566* (2013.01); *A63F 9/001* (2013.01); *A63F 2009/0033* (2013.01); *A63F 2250/50* (2013.01)

(58) Field of Classification Search
None
See application file for complete search history.

(56) References Cited

U.S. PATENT DOCUMENTS

| | | |
|---|---|---|
| 4,431,395 A | 2/1984 | Babos |
| D314,854 S | 2/1991 | Brown |
| D378,286 S | 3/1997 | Chiu |
| 5,702,740 A * | 12/1997 | Wild .................. A23G 1/50 |
| | | 16/225 |
| D453,123 S | 1/2002 | Chuang |
| D465,314 S | 11/2002 | Chuang |
| 6,838,101 B2 | 1/2005 | Hoy |
| 7,210,920 B2 | 5/2007 | Kolz |
| 8,403,722 B2 | 3/2013 | Madonia |
| 2008/0064291 A1 | 3/2008 | Barnes |
| 2008/0289992 A1 | 11/2008 | Shepherd |

(Continued)

OTHER PUBLICATIONS

Maysem, Gingerbread House Class, Ode to Inspiration <http://odetoinspiration.com/2011/12/gingerbread-house-class/> (Year: 2011).*

(Continued)

*Primary Examiner* — Viren A Thakur
*Assistant Examiner* — Thanh H Nguyen
(74) *Attorney, Agent, or Firm* — Adam R. Stephenson, LTD.

(57) ABSTRACT

Implementations of edible structures may include: at least four walls, each wall having an inner side and an outer side, at least one flexible interior wall support coupled to the inner sides of the at least four walls where the width of the at least one flexible interior wall support is less than the height of any of the at least four walls, a roof having two or more roof sections, wherein the roof is configured to rest on the at least four walls, each roof section having an inner side and an outer side, and at least one flexible interior roof support coupled to the inner sides of the two or more roof sections, wherein the at least one flexible interior roof support is not directly connected to the at least one flexible interior wall support.

20 Claims, 5 Drawing Sheets

(56) References Cited

U.S. PATENT DOCUMENTS

2010/0221390 A1 9/2010 Madonia
2010/0272864 A1* 10/2010 Schreiner ............. B65D 65/463
426/93

OTHER PUBLICATIONS

Denise, Part III: Gingerbread City 2009 . . . , There's a Newf in My Soup! (p. 6-12) <http://newfinmysoup.blogspot.com/2009/10/> (Year: 2009).*
Shepherd, Breakaway Box with Hinged Sides, thespruce.com, copyright 2010. <https://www.thespruce.com/easy-ways-to-make-school-dioramas-2366269> (Year: 2010).*
Ihnat, What's the best way to keep your gingerbread house from falling?, thetakeout.com, <https://thetakeout.com/what-s-the-best-way-to-keep-your-gingerbread-house-from-1821467399> (Year: 2017).*
Colleen, Candy-Less Gingerbread House, Sugar Aunts, 2012 <https://web.archive.org/web/20140913124929/http://www.sugaraunts.com/2012/12/candy-less-gingerbread-house-25-days-of.html> (Year: 2012).*
Pre-Assembled Gingerbread House Kit, Gingerbread House Heaven <http://www.gingerbread-house-heaven.com/pre-assembled-gingerbread-house-kit.html> (Year: 2018).*
Kirk, DIY Collapsible cardboard playhouse, sheknows.com, Aug. 1, 2012, <https://web.archive.org/web/20130313193711/https://www.sheknows.com/parenting/articles/967135/diy-collapsible-cardboard-playhouse/> (Year: 2012).*

\* cited by examiner

INTERIORLY SUPPORTED EDIBLE STRUCTURE AND RELATED METHODS

CROSS REFERENCE TO RELATED APPLICATIONS

This application is a continuation-in-part application of the earlier U.S. Utility Patent Application to Jason May entitled "Edible Structure Interior Pop-Up Assembly," application Ser. No. 14/948,358, filed Nov. 22, 2015, now pending, the disclosure of which is hereby incorporated entirely herein by reference.

BACKGROUND

1. Technical Field

Aspects of this document relate generally to edible structures. More specific implementations involve edible structures shaped as houses.

2. Background

Conventionally, to build an edible structure, walls and a roof are prepared and baked separately and then joined together by a user. The user conventionally joins the separate pieces of the structure using icing. Small decorative houses are common examples of edible structures. Candies and other edibles are typically applied to the structure after the house is assembled as decoration.

SUMMARY

Implementations of edible structures may include: at least four walls, each wall having an inner side and an outer side. Implementations may also include at least one flexible interior wall support coupled to the inner sides of the at least four walls where the width of the at least one flexible interior wall support is less than the height of any of the at least four walls. Implementations may also include a roof having two or more roof sections, wherein the roof is configured to rest on the at least four walls, each roof section having an inner side and an outer side. Implementations may also include at least one flexible interior roof support coupled to the inner sides of the two or more roof sections, wherein the at least one flexible interior roof support is not directly connected to the at least one flexible interior wall support.

Implementations of the edible structure may include one, all, or any of the following:

The structure may include an edible flexible interior wall support and an edible flexible interior roof support.

The structure may include an edible coupling mechanism that couples the flexible interior wall support with the at least four walls and couples the flexible interior roof support with the two or more roof sections.

The structure may include a flexible interior wall support that forms a closed perimeter.

The at least four walls and the two or more roof sections may be made from gingerbread.

The flexible interior wall support and the flexible interior roof support may include a paper material.

The at least one flexible interior wall support may be coupled to two end portions of each wall of the at least four walls.

Implementations of edible structures may include: a plurality of walls, each wall having an inner side and an outer side. Implementations may also include at least one flexible interior wall support coupled to the inner sides of each wall of the plurality of walls, wherein the width of the flexible interior wall support is less than the height of any wall of the plurality of walls, wherein the at least one flexible interior wall support is coupled to the inner sides of an entire length of each wall of the plurality of walls. Implementations may also include a roof having a plurality of roof sections, wherein the roof is configured to rest on the plurality of walls, each roof section having an inner side and an outer side. Implementations may also include at least one flexible interior roof support coupled to the inner sides of the two or more roof sections, wherein the at least one flexible interior roof support is not directly connected to the at least one flexible interior wall support.

Implementations of the edible structure may include one, all, or any of the following:

The structure may include an edible flexible interior wall support and an edible flexible interior roof support.

The structure may include an edible coupling mechanism that couples the flexible interior wall support with the plurality of walls and couples the flexible interior roof support with each roof section.

The at least four walls and the two or more roof sections may be made from gingerbread.

The flexible interior wall support and the flexible interior roof support may include a paper material.

The at least one flexible interior wall support may be coupled to two end portions of each wall within the plurality of walls.

Implementations of edible structures may include: at least four walls, each wall having an inner side and an outer side. It may also include at least four flexible interior wall supports coupled to the inner sides of at least two walls, wherein the width of the at least four flexible interior wall supports is less that the height of any of the at least four walls. It may also include a roof having two or more roof sections, wherein the roof is configured to rest on the at least four walls, each roof section having an inner side and an outer side. It may also include at least one flexible interior roof support coupled to the inner sides of at least two roof sections of the roof, wherein the at least one flexible interior roof support is not directly connected to the at least four flexible interior wall supports.

Implementations of the edible structure may include one, all, or any of the following:

The flexible interior wall support and the flexible interior roof support may be edible.

The coupling mechanism that couples the flexible interior wall support with the at least four walls and couples the flexible interior roof support with the two or more roof sections may be edible.

The at least four walls and the two or more roof sections may be made from gingerbread.

The flexible interior wall support and the flexible interior roof support may include a paper material.

The at least four flexible interior wall supports may be coupled to an end portion of each wall within the plurality of walls.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended edible structure and will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such edible structures, and implementing components and methods, consistent with the intended operation and methods.

Figure 1:
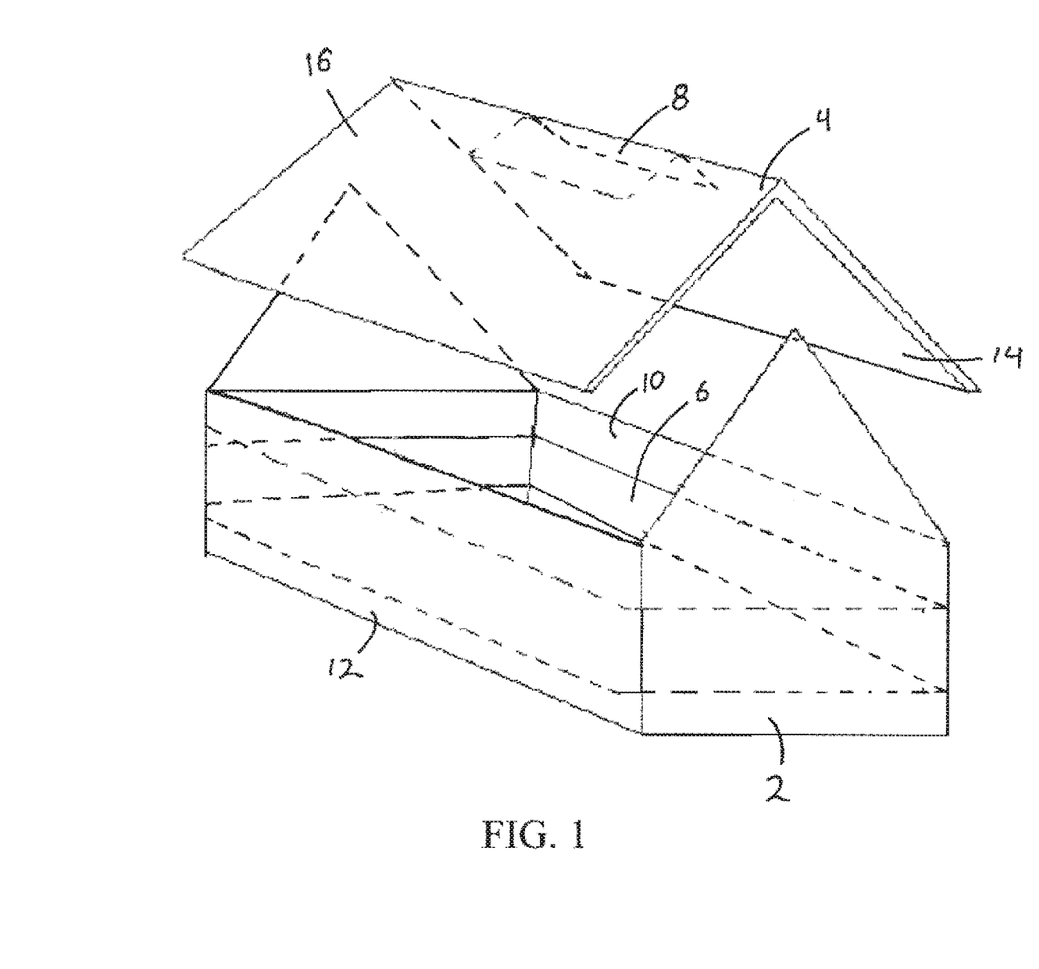
FIG. 1 is a view of an edible structure with flexible interior wall and roof supports prior to the roof resting on the walls.
Figure 2:
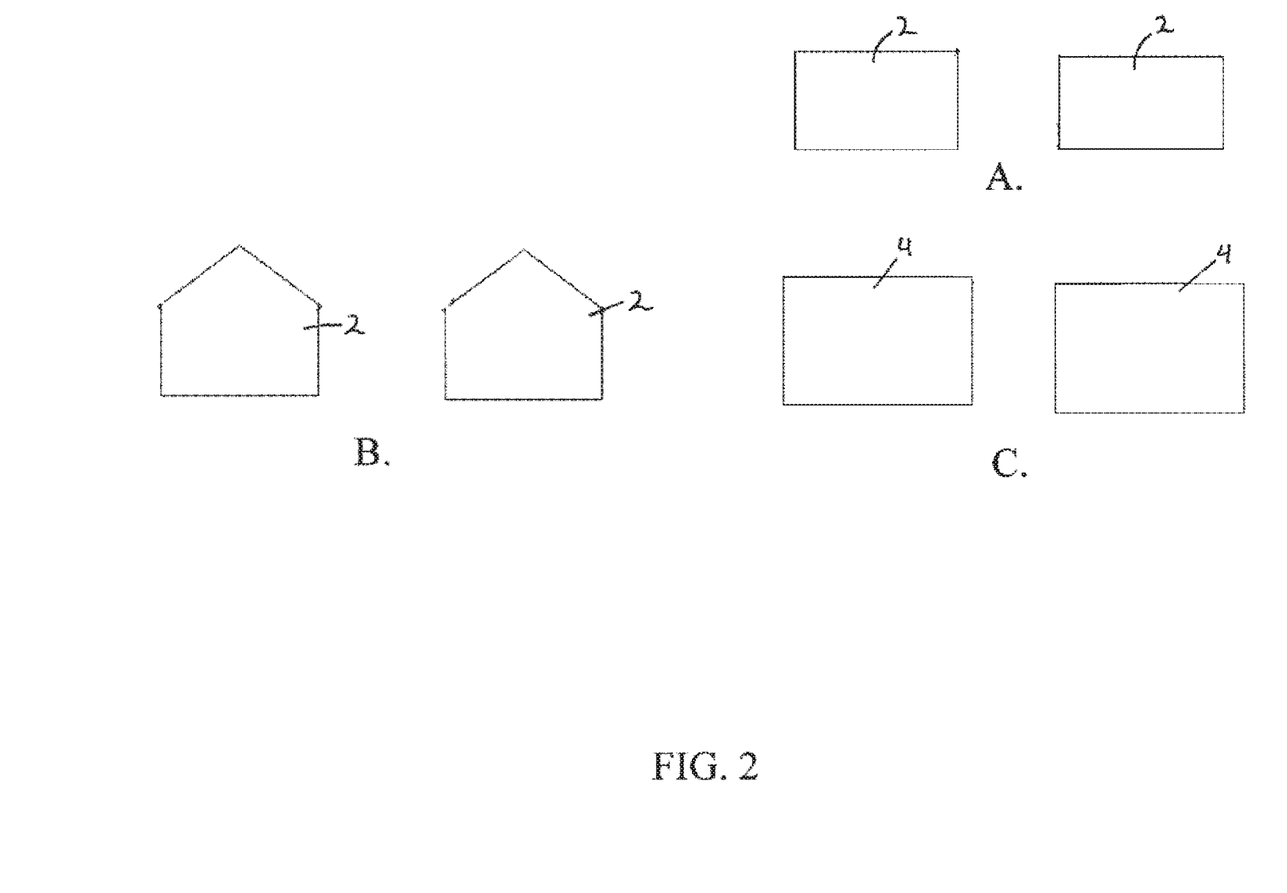
FIG. 2 is two different views A and B of two pairs of walls and a view C of two roof sections.

Referring now to FIG. 1, an edible structure with a flexible interior wall support and a flexible interior roof support, prior to the roof resting on the walls, is illustrated. The edible structure may include walls 2 and roof sections 4. Each wall has an inner side 10 and an outer side 12. Each roof section has an inner side 14 and an outer side 16. The inner sides of the walls and roof sections may face the interior of the edible structure after the edible structure is assembled. Separated views of the walls 2 and roof sections 4 are illustrated in FIG. 2. The edible structure may or may not represent a house. In various implementations, the edible structure may represent, by non-limiting example, an animal, a building, a vehicle, a figure, or any other three dimensional design. In the illustrated implementation the edible structure has four walls, however, in various implementations the structure may have any number of walls. In various implementations the walls may approximately be the same shape and size, while in other implementations all the walls or some of the walls differ in shape and size from one another. In the implementation illustrated by FIG. 1 the walls 2 are rectangular and pentagonal, however, in other implementations the walls may be any other closed shape.

In the implementation illustrated in FIG. 1, the edible structure has two roof sections 4, however, in various implementations the edible structure may have any number of roof sections. The roof sections may be approximately the same shape and size, while in other implementations the roof sections may vary in shape and size. The roof sections may be rectangular, triangular, or any other closed shape.

In one implementation the walls and the roof sections may be made from gingerbread and the edible structure may be a gingerbread house. In other various implementations, the walls and roof sections may be made from, by non-limiting example, shortbread, sugar cookies, or any other baked dough. In still other implementations, the walls and the roof sections are not baked. The walls may or may not be the same material as the roof sections, and the roof sections may be made from more than one material and the walls may be made from more than one material.

The roof sections may be configured to rest upon the walls in the edible structure, as indicated in FIG. 1.

Figure 3:
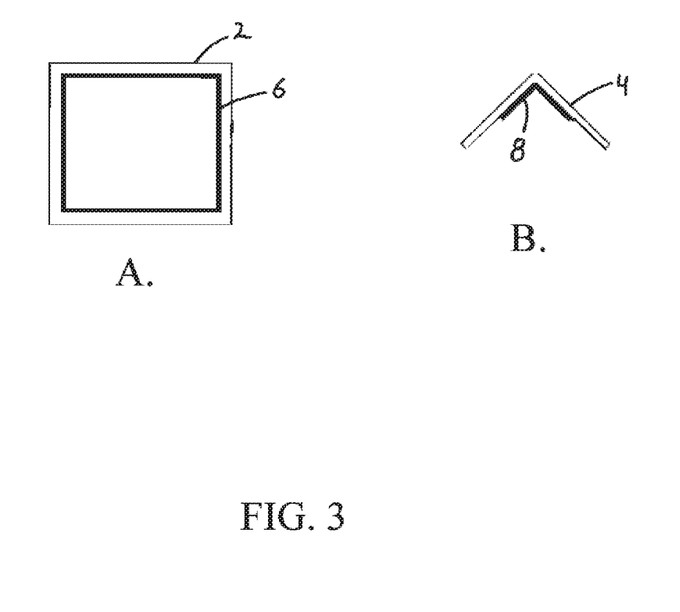
FIG. 3 is a top view A of an interior wall support coupled to four walls and a side view B of an interior roof support coupled to two roof sections.

FIG. 1 illustrates a flexible interior wall support 6 coupled to the inner side 10 of the walls 2 and a flexible interior roof support 8 coupled to the inner sides 14 of the roof sections 4. FIG. 3, view A is a top view of a wall support 6 connected to walls 2 and FIG. 3, view B is a side view of a roof support 8 connected to roof sections 4. In various implementations the wall and roof supports may or may not be directly connected to the walls or roof sections. In the illustrated implementations, the wall support and the roof support are not directly connected. In various implementations, the wall support and the roof support are smaller than the walls or the roof. As illustrated by FIG. 1, the wall support may be a strip with a width significantly less than the height of the walls and the roof support may be a strip with a width significantly less than the width of the roof.

The wall and roof supports may be coupled to the walls and roof sections through, by non-limiting example, glue, icing, fasteners, or by some other attaching mechanism. The attaching mechanism may or may not be edible. In implementations where the walls and roof sections are baked, the wall and roof supports may be coupled to the walls and roof sections during baking, before baking, or after baking.

In various implementations the wall support 6 may be coupled to the walls at an end portion of the walls. In other implementations the wall support may be coupled to the walls at other portions aside from the end portions of the wall. In still other implementations, the wall support 6 is coupled to the wall along the entire length of the wall.

The wall support 6 may extend along the entire length of one wall or the entire length of more than one wall. In other implementations, the wall support 6 may not extend along the entire length of a wall 2. The wall 6 and roof 8 supports may be coupled to the walls 2 and roof sections 4 at various points on the supports, walls, and roof sections. In the implementation illustrated in FIG. 1, the wall support 6 extends around the walls 2 near the middle of the walls, however, in various implementations the wall support may extend around the walls near the top of the walls, the bottom of the walls, or any other location or combination of locations on the walls.

Likewise, the roof support 8 may be coupled to the roof sections 4 near the middle of the roof sections or to a side of the roof sections. Further, in various implementations the length of the roof support 8 may extend between the two roof sections 4 as shown in FIG. 1, while in other implementations the roof support may be positioned so that the length of the support runs down the roof sections rather than across the roof sections. Still in other implementations, the roof support 8 may be located at any location on the roof sections 4.

In the implementation illustrated in FIG. 1, a single wall support 6 is used, however, in various implementations any number of wall supports may be used, including, by non-limiting example, two, three, four, five, six, seven and eight or more wall supports. In one implementation, four wall supports are used with each wall support joining two walls at the four corners formed by the walls of the edible structure. In still other implementations, walls may have multiple wall supports on the same walls.

In the implementation illustrated in FIG. 1, a single roof support 8 is illustrated, however, in various implementations any number of roof supports may be used. In one implementation where the roof includes four roof sections, four roof supports may be used to join the roof sections together.

Figure 4:
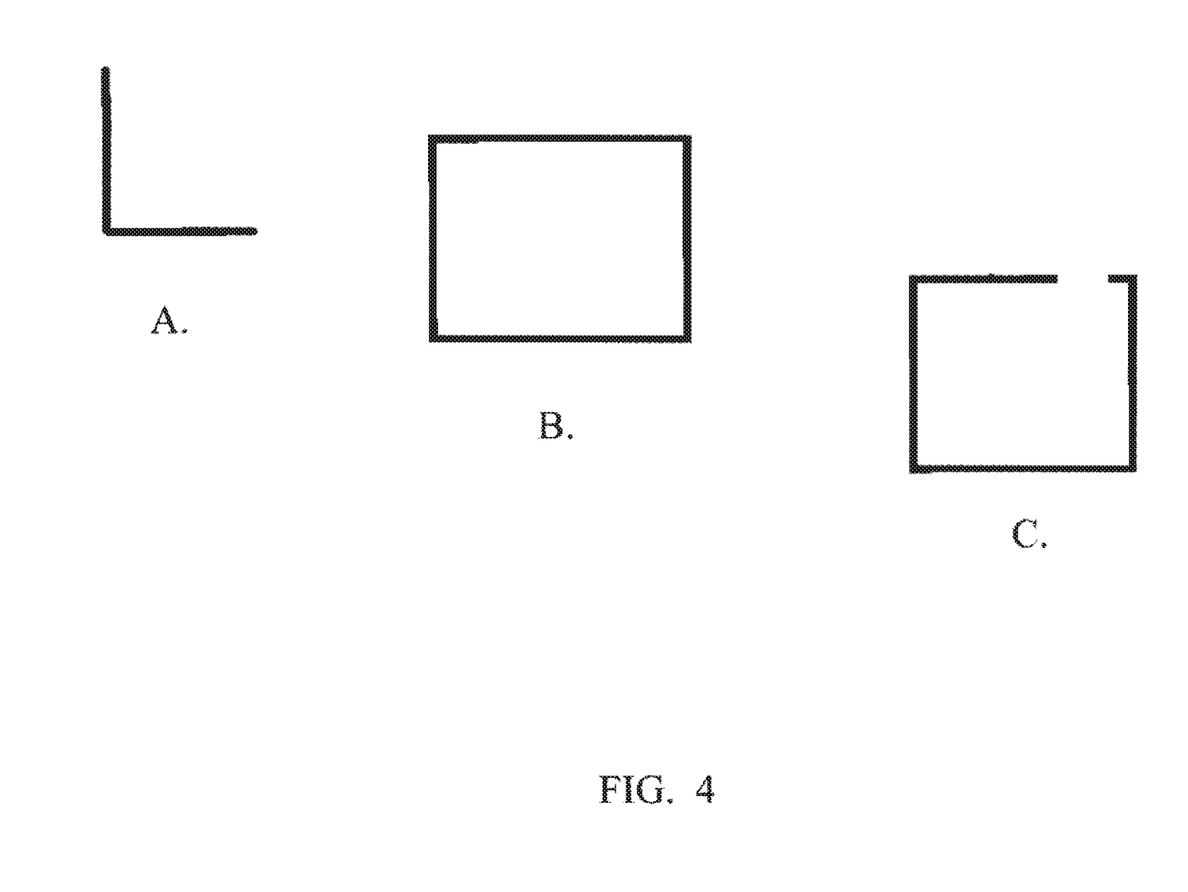
FIG. 4 is three different views A, B, and C of three different interior wall and roof supports.

Referring to FIG. 4, various flexible interior wall supports and flexible interior roof supports for an edible structure are illustrated. The flexible interior wall or roof supports may form a closed perimeter, as illustrated by FIG. 4, view B, or may remain open as illustrated in FIG. 4, views A and C. In implementations where the interior wall supports form a closed perimeter, the ends of the support may be joined together, by non-limiting example, using glue, a staple, an edible adhesive, or some other joining mechanism.

In various implementations, the entire flexible supports 6 and 8 are flexible, however, in other implementations only select points of the flexible supports 6 and 8 are flexible. In these other implementations a flexible support may contain any number of flexible points, including, but not limited to, one, two, three, four, five, six, seven and eight or more flexible points. The flexible supports may have varying degrees of flexibility. In some implementations, the flexible supports will be able to fold and unfold from 0 degrees to 180 degrees.

The flexible supports 6 and 8 may be made from various materials, such as, by non-limiting example, paper, fabric, fibers, plastic, or an edible material, such as, by non-limiting example, rice paper, fruit leather, and any other material that can be ingested by a human. In implementations where the flexible support is made from paper, the paper may be, by non-limiting example, cardboard, cardstock, corrugated cardboard, or any other type of paper material.

In one implementation the flexible interior wall support 6 is long enough to couple no more than two walls together. In other various implementations, the wall support 6 is long enough to couple all the walls together. In still other implementations, the wall support 6 is only long enough to cover more than two walls but not all the walls together.

In one implementation where two roof sections are used, the flexible interior roof support is long enough to couple the entire length of the roof sections together. In other various implementations, the roof support may couple only portions of the roof sections together. In implementations where there are more than two roof sections, the flexible interior roof support may or may not be long enough to couple together all the roof sections of the roof.

The wall support 6 may be almost as wide as the height of the walls 4, as wide as the thickness of the wall support, or any width in between. The roof support 8 may cover the entire area of the inner sides 14 of the roof sections, or may cover any portion of the inner sides 14 of the roof sections.

Figure 5:
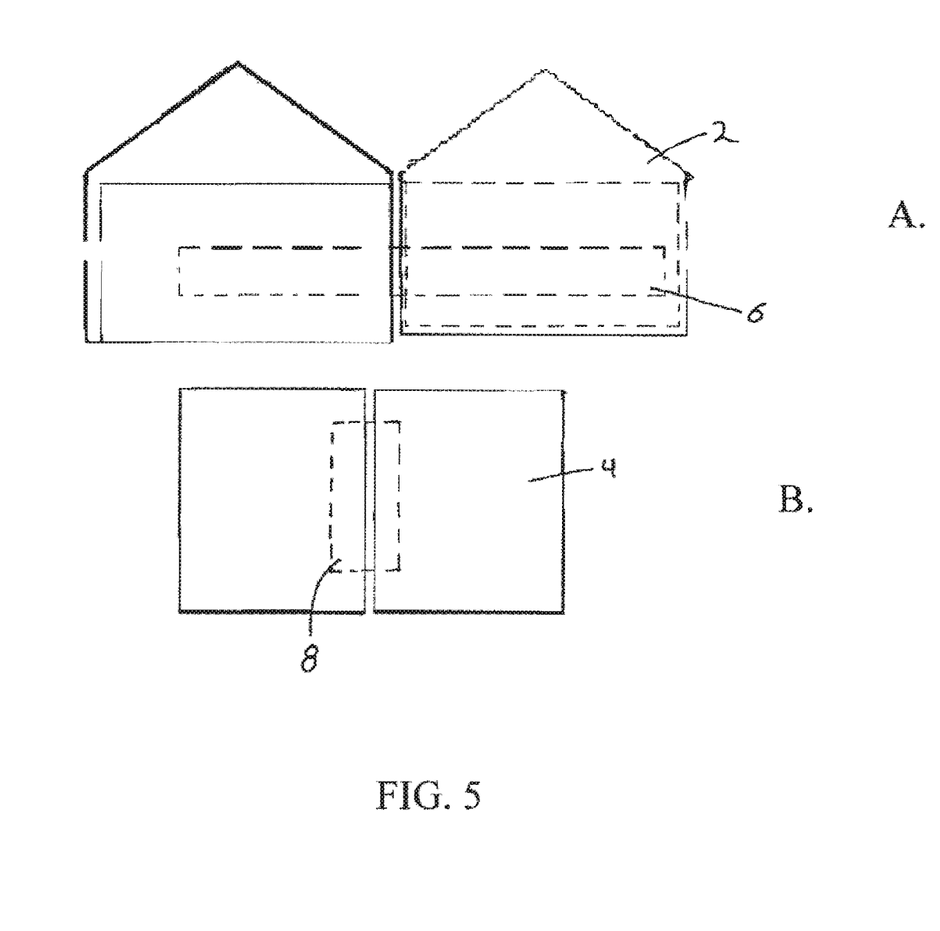
FIG. 5 is a view A of a collapsed set of four walls and a view B of a collapsed set of two roof sections.

Referring now to FIG. 5, view A, a view of four walls lying flat on top of one another is shown. In various implementations, the walls of the edible structure may be configured to collapse. The flexible interior wall support 6 may remain coupled to the walls when the walls collapse and lay flat. The wall support 6 may be flexible enough to fold in order to correspond with the collapsed walls and unfold in order to correspond with the walls when they are not collapsed.

Referring now to FIG. 5, view B, a view of two roof sections lying flat is shown. The roof sections 4 may be configured to collapse to a flat state. In some implementations the roof sections may be configured to collapse and lie flat so the inner sides of the roof sections are facing one another. The interior flexible roof support 8 may be flexible enough to fold in order to correspond with the collapsed roof sections and unfold in order to correspond with the roof sections 4 when they are not collapsed.

In places where the description above refers to particular implementations of edible structures and implementing components, sub-components, methods and sub-methods, it should be readily apparent that a number of modifications may be made without departing from the spirit thereof and that these implementations, implementing components, sub-components, methods and sub-methods may be applied to other edible structures.

What is claimed is:

1. An edible structure kit, comprising:
    at least four edible walls, each wall comprising an inner side and an outer side, each wall of the at least four edible walls substantially parallel to every other wall of the at least four edible walls;
    at least one flexible interior wall support coupled to the inner sides of the at least four edible walls, wherein the width of the flexible interior wall support is less than the height of any of the at least four edible walls;
    an edible roof comprising two or more roof sections, each roof section comprising an inner side and an outer side, wherein the edible roof is configured to rest on the at least four edible walls and wherein each roof section of the two or more roof sections is substantially parallel to every other roof section of the two or more roof sections; and
    at least one flexible interior roof support coupled to the inner sides of the two or more roof sections, wherein the at least one flexible interior roof support is not directly connected to the at least one flexible interior wall support.

2. The kit of claim 1, wherein the flexible interior wall support and the flexible interior roof support are edible.

3. The kit of claim 1, wherein an edible coupling mechanism couples the flexible interior wall support with the at least four edible walls and couples the flexible interior roof support with the two or more roof sections.

4. The kit of claim 1, wherein the flexible interior wall support forms a closed perimeter.

5. The kit of claim 1, wherein the at least four edible walls and the two or more roof sections comprise gingerbread.

6. The kit of claim 1, wherein the flexible interior wall support and the flexible interior roof support comprise a paper material.

7. The kit of claim 1, wherein the at least one flexible interior wall support is coupled to two end portions of each wall of the at least four edible walls.

8. An edible structure kit, comprising:
    a plurality of edible walls, each wall comprising an inner side and an outer side, each wall of the plurality of edible walls substantially parallel to every other wall of the plurality of edible walls;
    at least one flexible interior wall support coupled to the inner sides of each wall of the plurality of edible walls, wherein the width of the flexible interior wall support is less than the height of any wall of the plurality of edible walls;
    wherein the at least one flexible interior wall support is coupled to the inner sides of an entire length of each wall of the plurality of edible walls;
    an edible roof comprising a plurality of roof sections, each roof section comprising an inner side and an outer side, wherein the edible roof is configured to rest on the plurality of edible walls; and
    at least one flexible interior roof support coupled to the inner sides of each roof section of the roof, wherein the at least one flexible interior roof support is not directly connected to the at least one flexible interior wall support;

wherein the edible roof is not directly coupled to the plurality of edible walls; and wherein each roof section of the plurality of roof sections is substantially parallel to every other roof section of the plurality of roof sections.

9. The kit of claim 8, wherein the at least one flexible interior wall support and the at least one flexible interior roof support are edible.

10. The kit of claim 8, wherein an edible coupling mechanism couples the at least one flexible interior wall support with the plurality of edible walls and couples the at least one flexible interior roof support with each roof section.

11. The kit of claim 8, wherein the at least four edible walls and the two or more roof sections comprise gingerbread.

12. The kit of claim 8, wherein the at least one flexible interior wall support and the at least one flexible interior roof support comprise a paper material.

13. The kit of claim 8, wherein the at least one flexible interior wall support is coupled to two end portions of each wall within the plurality of edible walls.

14. An edible kit, comprising:
at least four edible walls, each wall comprising an inner side and an outer side, each wall of the at least four edible walls substantially parallel to every other wall of the at least four edible walls;
at least four flexible interior wall supports each coupled to the inner sides of at least two walls, wherein the width of the at least four flexible interior wall supports is less than the height of any of the at least four edible walls;
an edible roof comprising two or more roof sections, each roof section comprising an inner side and an outer side, wherein the edible roof is configured to rest on the at least four edible walls and wherein each roof section of the two or more roof sections is substantially parallel to every other roof section of the two or more roof sections; and
at least one flexible interior roof support coupled to the inner sides of at least two roof sections of the edible roof, wherein the at least one flexible interior roof support is not directly connected to the at least four flexible interior wall supports.

15. The kit of claim 14, wherein the at least four flexible interior wall supports and the at least one flexible interior roof support are edible.

16. The kit of claim 14, wherein an edible coupling mechanism couples the at least four flexible interior wall supports with the at least four edible walls and couples the at least one flexible interior roof support with the at least two roof sections.

17. The kit of claim 14, wherein the at least four edible walls and the at least two or more roof sections comprise gingerbread.

18. The kit of claim 14, wherein the at least four flexible interior wall supports and the at least one flexible interior roof support comprise a paper material.

19. The kit of claim 14, wherein the at least four flexible interior wall supports are coupled to an end portion of the at least two walls.

20. The kit of claim 1, wherein the inner side of each wall of the at least four edible walls is directly coupled to the inner side of an opposing wall of the at least four edible walls.

* * * * *

UNITED STATES PATENT AND TRADEMARK OFFICE
CERTIFICATE OF CORRECTION

PATENT NO. : 11,266,155 B2
APPLICATION NO. : 15/342558
DATED : March 8, 2022
INVENTOR(S) : Jason May It is certified that error appears in the above-identified patent and that said Letters Patent is hereby corrected as shown below:

In the Claims

Column 7, Line 26, Claim 14, delete "An edible kit,", insert -- An edible structure kit, --

Signed and Sealed this
Nineteenth Day of April, 2022

Katherine Kelly Vidal
*Director of the United States Patent and Trademark Office*